United States Patent [19]

Miller

[11] Patent Number: 4,521,664

[45] Date of Patent: Jun. 4, 1985

[54] PROCESS AND APPARATUS FOR SURFACING WITH HIGH DEPOSITION AND LOW DILUTION

[75] Inventor: Robert F. Miller, Dover, Pa.

[73] Assignee: Teledyne, Inc., York, Pa.

[21] Appl. No.: 436,816

[22] Filed: Oct. 26, 1982

[51] Int. Cl.³ .............................................. B23K 9/04
[52] U.S. Cl. .............................. 219/76.14; 219/125.12
[58] Field of Search ............. 219/76.14, 76.12, 137 R, 219/76.1, 125.12

[56] References Cited

U.S. PATENT DOCUMENTS 2,000,723  5/1935  Suits ................................. 219/137 R
2,813,190 11/1957  Felmley, Jr. ..................... 219/76.14
3,469,305  9/1969  Tamura ........................... 219/137 R

FOREIGN PATENT DOCUMENTS 211705  4/1968  U.S.S.R. ............................. 219/158

Primary Examiner—Roy N. Envall, Jr.
Assistant Examiner—Alfred S. Keve
Attorney, Agent, or Firm—Shoemaker and Mattare, Ltd.

[57] ABSTRACT

A metal deposition process and apparatus is used to surface materials and includes a power supply connected to electrode wires and to the workpiece to establish a wire arc between the electrodes and a substrate arc between the positive electrode and the workpiece.

13 Claims, 23 Drawing Figures

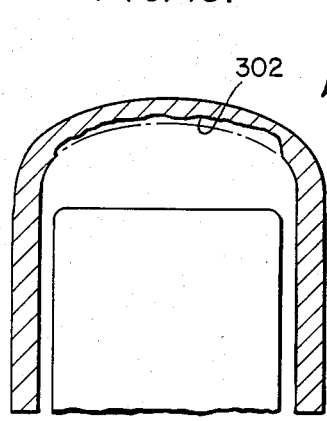
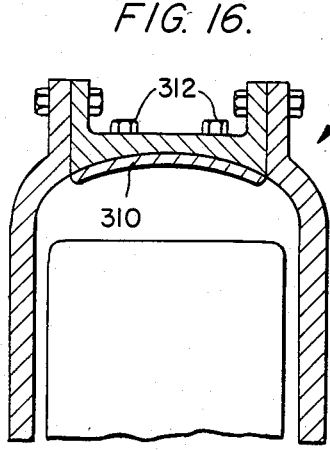
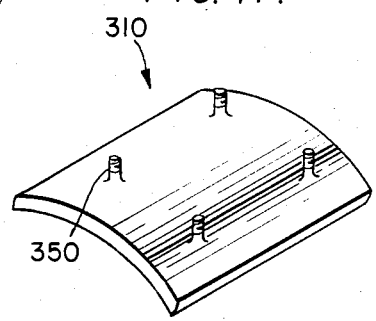
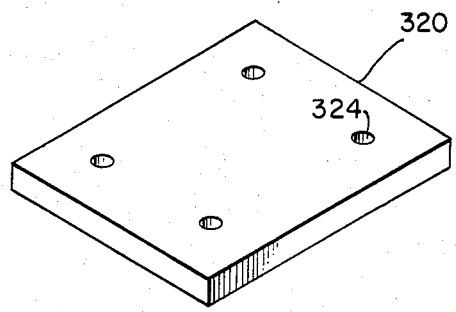
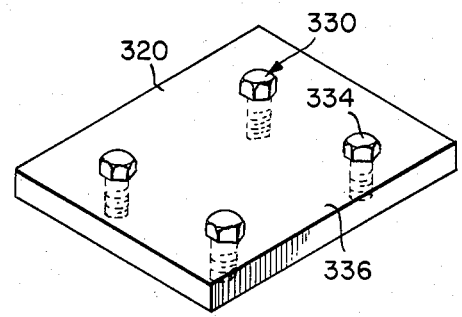
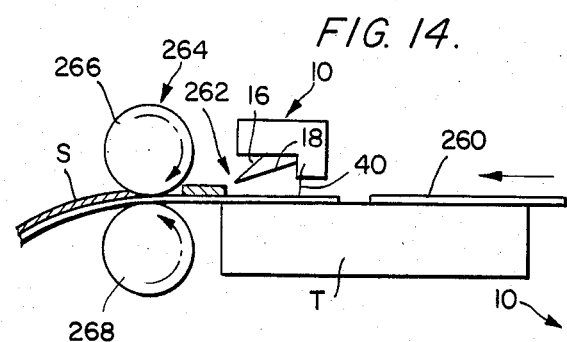
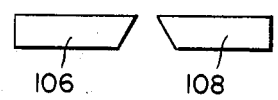
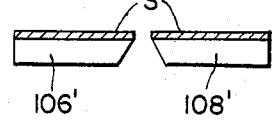
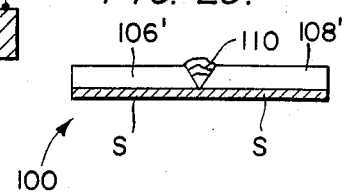
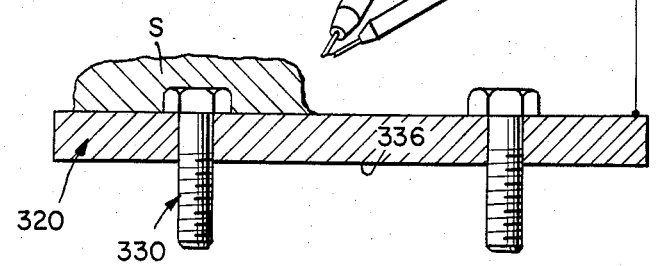

PROCESS AND APPARATUS FOR SURFACING WITH HIGH DEPOSITION AND LOW DILUTION

BACKGROUND OF THE INVENTION

The present invention relates, in general, to surfacing methods and apparatus, and, more particularly, to improvements in such surfacing methods and apparatus.

Surfacing is the deposition of filler metal on the surface of a base metal. Its purpose is to provide the properties or dimensions necessary to meet a given service requirement. There are several types of surfacing. The major categories are cladding, hard facing and build-up.

The desired properties are corrosion resistance, wear resistance, dimensional control and metallurgical needs.

Surfacing is often used in the field of repair as well as the initial manufacturing.

Among the main economic and technical objectives of any surfacing process are: (1) to maintain low dilution; and (2) to achieve high deposition rates, particularly with attractive usability characteristics. Low dilution allows the deposit to perform at its maximum potential and to make the application of additional layers unnecessary. High deposition rates are highly desirable from an obvious economic viewpoint. An example of a very high deposition rate would be a rate greater than 40 lbs. per hour.

It is very difficult to achieve the first two objectives simultaneously, as high electrode melting rates are generally accomplished by the use of high currents which invariably lead to high dilution. Consequently, many of the high deposition rate processes suffer from high dilution and penetration. Also, the high heat input required to realize high deposition rates limits the processes considerably. Specific precautions must be taken to reduce the workpiece temperature to prevent overheating of the workpiece and also to limit dilution and penetration. There are state of the art methods that attempt to overcome these problems. One method is to use a long electrical stickout to minimize penetration, however, arc instability, excessive spatter, difficult arc starts limits the usefulness of this approach. Another method is the use of strip electrodes-submerged arc welding. While high deposition rates are achieved it is generally at the expense of alloy selection since hard facing strip electrodes cannot be economically or practically fabricated.

Surfacing is distinguished from joining in several important areas such as dilution control. In fact, probably the single biggest difference between welding a joint and surfacing is that the former penetration is normally desirable whereas in the latter penetration is frequently undesirable.

From a metallurgical point of view, the compositions and properties of surfacing deposits are strongly influenced by the extent of dilution. An example of a joining method is disclosed in U.S. Pat. No. 4,246,463.

Thus, there is a need for a surfacing process which combines high deposition rate, low dilution, effective process control, and adequate alloy selection.

SUMMARY OF THE INVENTION

Over a wide range of deposition rates the apparatus and method of surfacing embodying the teaching of the present invention controls the amount of penetration and dilution to much lower values than that which are realized with conventional processes. Furthermore, dilution can be controlled to very low values even while maintaining high deposition rates.

The invention includes a pair of consumable electrode wires connected to a DC power source and a ground wire connecting the workpiece to the negative terminal of the DC power source.

We believe that two arcs are established during the process, a wire arc between the two electrodes and a substrate arc between the positive electrode and the substrate. Preferably, cored electrodes wires which contain predetermined quantities and types of filler, are oscillated together in a square or sawtooth weave pattern. The stringer technique is also applicable.

Because the vast majority of heat is generated primarily by the wire arc above the plate and to a lesser extent by the colder substrate arc, tremendous deposition rates can be realized, with a relatively small portion of the heat transferred to the workpiece for minimum penetration and dilution. The amount of substrate melting is controlled by the height of the welding head above the substrate. At extremely high deposition rates (100–200 lbs per hour), low dilution levels (0–30%) are predictably realized with the apparatus and method of the present invention. The inventive DC power surfacing system is a great improvement over known processes, such as a two wire series arc process which typically uses AC power without a grounding wire. The AC series arc process suffers from an extremely unstable arc, high spatter and poor process control. In the case of the present inventive process, ideal arc stability and process control are readily obtained resulting in low spatter volume and precisely controlled dilution at extremely high deposition rates.

Using the electrical orientation as noted above and the DC power mode, extremely good control is obtained over bead configuration and subsequent bead tie-in which results in an extremely uniform and smooth single or multi-layer deposits.

Other advantages to the process and apparatus of the present invention can be realized by varying either the size of the two electrode wires and/or the chemical composition of these two wires. For example, by adding two wires at different compositions, a 50/50 mixture can be deposited with very little or no dilution from the substrate. One of these wires can be a mild steel while the other wire contains either a tungsten or titanium carbide. By proper adjustments of voltage, amperage and wire feed, a very thin carbide containing deposit can be deposited at high deposition rates. The deposit composition, of course, can be altered by changing the deposit composition of either wire. By using two different wires, alloy percentages in a deposit can be changed further by altering the wire feed speeds, amperages and voltages.

Embodiments of the invention can use a reverse polarity type of setup, or a straight polarity setup.

The method and apparatus of the present invention deposits metal in a manner that allows the deposit to perform at its maximum design potential. The inventive method and apparatus results in deposits with low dilution and high buildup and, by virtue of its inherent characteristics, permits easy edge welding, such as knife blades, as compared to known processes, and can be executed at high deposition rates due to the controlled propulsion of molten particles.

Additional disclosure regarding the use of the inventive method and apparatus to fabricate surfaced plates is also included.

OBJECTS OF THE INVENTION

It is a main object of the present invention to surface materials in an arc welding process at very high deposition rates with low dilution levels.

It is another object of the present invention to increase the life of metallic components subject to wear and/or corrosion.

It is still another object of the present invention to produce a smooth, uniform surface in an arc welding process.

It is yet another object of the present invention to surface materials in an arc welding process to produce a high buildup.

It is a further object of the present invention to surface materials in an arc welding process with good arc stability.

It is still a further object of the present invention to surface materials in an arc welding process with low spatter volume.

It is yet a further object of the present invention to surface materials in an arc welding process using a single and/or multi-pass technique.

It is another object of the present invention to surface materials in an arc welding process using an electrode oscillation and/or stringer technique.

It is another object of the present invention to surface materials in an arc welding process using only two arcs.

It is another object of the present invention to apply a low dilution, high deposition rate metal surfacing process in various manners.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIGS. 11-14 illustrate wear plate production methods embodying the teachings of the present invention.

FIGS. 15-20 illustrate an application of the method and apparatus embodying the teachings of the present invention to the production of wear plates for pump shells.

FIGS. 21-23 illustrate a method of joining two plates to form a wide plate in the application of the method and apparatus embodying the teachings of the present invention as illustrated in FIGS. 2-4.

DETAILED DESCRIPTION OF THE INVENTION

Figure 1:
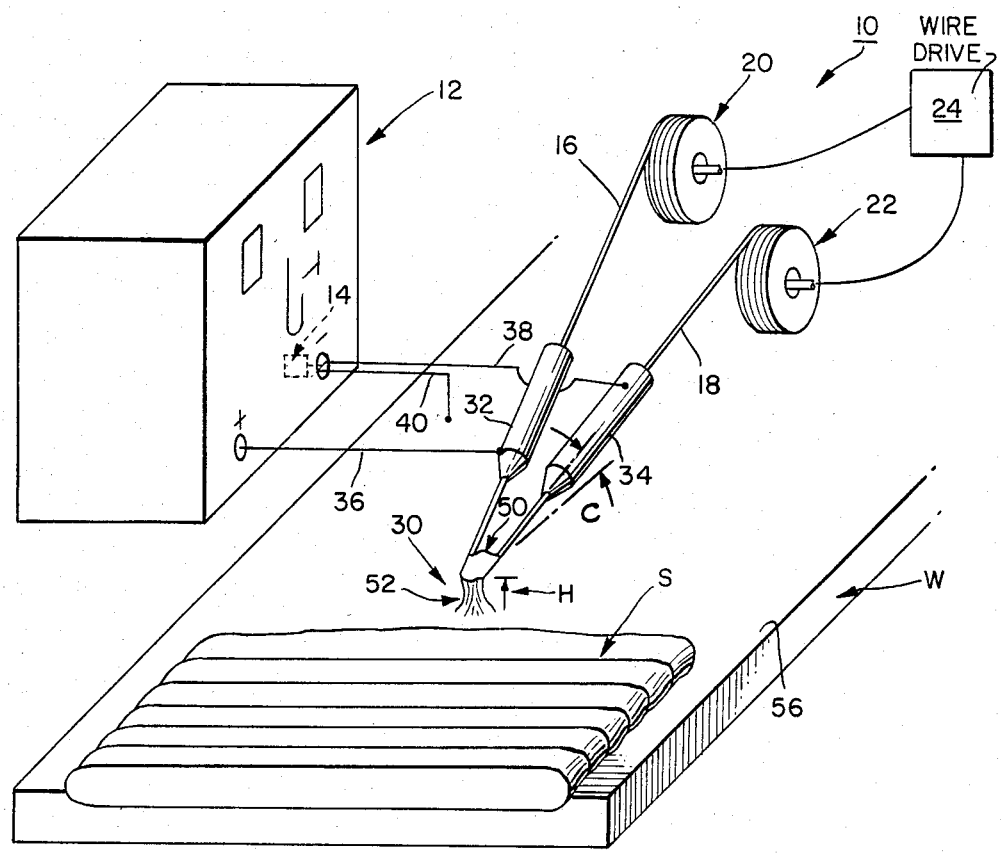
FIG. 1 is a perspective view of the apparatus used in the method and apparatus embodying the teachings of the present invention.

Shown in FIG. 1 is a surfacing system 10 embodying the teachings of the present invention. The system 10 includes a DC power supply means 12 having appropriate circuitry, such as ground wire circuitry 14, and a pair of electrode wires, including positive wire 16 and negative wire 18. The wires are fed from supply sources 20 and 22, respectively, and these sources can be driven by a drive means 24 which is controllable and adjustable so that the wires are fed to work area 30 at appropriate rates. The feed rate for wires 16 and 18 is selected according to criteria known to those skilled in the art based on this disclosure.

Contact tips 32 and 34 connect the wires 16 and 18 to the power supply means via leads 36 and 38, and a ground lead 40 connects substrate, or workpiece W; to the negative sides of the power supply means.

At the work area 30, two arcs are established, a wire arc 50 between the wires 16 and 18, and a substrate arc 52 between the positive wire 16 and top surface 56 of the workpiece W. The greatest percentage of available output current flows within the wire arc 50 established between the two electrodes, while a much smaller percentage of available output current remains to flow within the substrate arc 52 established between the positive electrode and the workpiece W. Typically, the total current is 700-800 amps wherein the current in the ground wire is only 200-300 amps. The ground wire plays a vital role by establishing a favorable condition whereby the substrate arc produces a significantly low level of spatter, while permitting controlled substrate melting.

Activation of system 10 deposits surfacing S on the workpiece W in accordance with the principles of electric arc surfacing techniques.

The wires 16 and 18 are positioned at a height H above the substrate top surface 56 and are oriented at an angle C with respect to that top surface. The angle C can be varied to control "arc blow", dilution, and deposit configuration. The angle can be adjusted according to known parameters, such as direction of movement and inclination (if any) of the substrate at the work area, and the like.

Preferably, the wires 16 and 18 are closed, cored electrode wires whose centers contain proprietary flux formulations required to achieve optimized surfacing characteristics well known to those skilled in the art. The cored wires of various configurations can be formulated to operate in different media such as air, inert or active gases, and sub arc welding fluxes while solid wires can only operate in protective gases and sub arc welding fluxes. Higher deposition rates for a given current are possible with cored wires and such cored wires are superior in that respect to solid wires. It is to be further noted that in the case of cored wires, hard facing, stainless steel, high alloy, low alloy and mild steel, it is necessary to formulate the core for compatibility with the particular surfacing process being performed. It is possible, by accident, that off-the-shelf wires could be commercially satisfactory, but experience has suggested that this is generally remote. Thus, for each composition and application, fill formations should be developed to obtain the desirable welding characteristics such as wetability, low spatter, and the like. Those skilled in the art will be able to define the formulations based on the disclosure presented herein.

However, this invention is not limited to the use of cored welding wires alone. Solid wires of various and similar compositions as the cored wires, except for hardfacing types which cannot be easily fabricated, can also be successfully used with the surfacing technique disclosed herein according to experience. The solid wires, as abovementioned, would require the use of protective gases and/or sub arc fluxes.

Preferably, the power supply 12 is a DC constant potential type power supply (DC-CP) as opposed to other types of power supplies, such as AC constant current type (AC-CC) or DC constant current type (DC-CC), or the like. It has been found that the DC/AC-CC supplies cannot deliver the necessary voltage at the high currents and impedances required by the process embodying the present invention. It is preferable to use a DC-CP source as opposed to other types of sources. In addition, it is preferable to use DC-CP sources with very flat volt-ampere curves.

It has also been found that arc stability and dilution control in the process embodying the teachings of the present invention are dependent on the power supply setting and wire speed established during the surfacing process. The DC-CP power supply allows power supply source voltage to be adjusted so that a stable arc between the two electrodes is ensured. Control of the substrate arc is obtained either by controlling the height of the wires 16 and 18 above the substrate or by controlling the impedance of the ground wire circuitry or both. The arc length of the substrate arc is primarily adjusted by altering head height; however, ground wire impedance can also be altered independently of or in conjunction with the height of the wires above the substrate, also referred to as head height. Wire feed rates in the present process are preferably adjusted so that a positive wire is fed at rates 40–60% higher than the negative wire feed rates.

The herein-described process has been used very successfully in the fabrication of composite wear plates such as high chromium iron types. Conventional composite high chromium iron wear plates contain numerous check relief cracks which are tolerated by industry. The cracks are a result of surfacing on a restrained plate. As the hot weld deposit contracts upon cooling, very high stresses are created. Since the plate is restrained, consequently, nearly all the strain must be accommodated by the deposit which usually has low ductility, thereby producing cracks. The final result is a composite wear plate or overlay riddled with cracks which generally penetrate the base plate. The degree of penetration is a function of bead contour, cooling rate, as well as base metal restraint.

Using the inventive surfacing method and apparatus previously described on an unrestrained plate, there is little distortion of the plate and thus the final plate is relatively free of cracks. Surfacing is performed on an unrestrained or floating plate which allows thermal expansion and contraction to take place within the plate itself. Stresses and strains which normally occur in the deposit are accommodated by the plate. The surfacing process and apparatus of the present invention can deposit weld metal at low dilutions and high deposition rates, while maximum heat input is generated by a weave technique that covers up to about 95% of the plate width in a single pass. This surfacing method and apparatus also provides an even heat distribution across the width and progressively for the entire length of the plate, and produces a smooth deposit which is essentially free of sites normally associated with crack initiation. Cracks which occur at starts can also be minimized by surfacing against a ductile deposit previously applied. A metallic or non-metallic bar can also be used.

Weld craters are normally sites for crack occurrence. To eliminate crater cracks crater filling techniques can be employed at the surfacing ends. Any rollover that takes place on the sides or ends can be cut off in another operation.

To avoid post welding distortion, plate removal from the fixture should be accomplished after the plate has cooled to at least 500° F.

This process has been used to fabricate clad plate which has minimal distortion. The method permits the plate to freely expand and contract in the length and width directions but not in the thickness or perpendicular planes during surfacing. Thus, it is believed that such a "floating plate" minimizes residual stresses, cracks and distortion for ready application without requiring further handling for straightening in most applications. While the clad plate fabrication method can be used with known arc welding processes, it is most attractive when used with the surfacing process herein described. The inherent ability of the presently described process to clad metal at low dilution levels and high deposition rates simultaneously makes it superior to any other known methods. Essentially crack-free wear plates are highly desirable where corrosion, fatigue, and/or accelerated wear associated with relief cracks are important considerations.

The present method and apparatus can be used to perform all of the surfacing techniques described above, and can be used with all the known electrode operating modes, such as stringer, pendulum, oscillating, and all other techniques known to those skilled in the art. Additionally, various types of electrodes can be used, such as gas shielded, self shielded and the like. The process is also applicable to the submerged arc process and also the use of metal powder additions in conjunction with the two wires 16 and 18. The use of these metal powders has the advantage of further reducing dilution, while increasing deposition rate as well as permitting the enrichment of alloy deposits not obtainable through the wires alone for improved wear and corrosion resistance. The power source, wire feed controllers, and the orientation and position of the electrode tips with respect to the workpiece can all be controlled in a manual, or automatic, manner as suitable via appropriate control means. The present process is applicable to mining, steel forming and utility industries, among others.

The present process permits high deposition rates into copper molds to form non-diluted hard surfacing, as well as other alloys of any desired shape and thickness.

The deposition rate limits of the present process may be as high as 200 lbs per hour or more. Currents used in these rates are on the order of 2,000 amps, and sustained processes can use banks or gangs of power sources to provide the necessary power.

In the initial start up of the process, an arc is established between the two wires, then the arc is brought just close enough to the workpiece to allow a minimum amount of surface heating or sweating. The molten metal is concurrently deposited onto the plate aided by gravity to form the surface deposit. The amount of substrate heating desired can be altered by varying the current flow to the workpiece by an external variable resistance or impedence inserted in lead 40. By varying the current through the plate, the deposition rate can be increased simply by altering the arc between the plate and the molten drop, which is propelled at a much faster rate than that of a pure gravity feed method alone.

FIGS. 2-23 show various applications for the above-disclosed surfacing process.

In the fabrication of wear plates distortion and check cracking can become increasingly more difficult to control as the width of the plate increases. This is also true in the hard facing of plates using the present process. However, use of the "floating plate" method earlier described minimizes distortion and check relief cracks. Plates having widths approaching 36" have been successfully fabricated with only incipient distortion. Further, distortion and unwanted check cracking can also be minimized by joining pre-surfaced narrow plate (6"-12" wide) into sheets which are larger than any of the pre-surfaced plates individually.

Figure 2:
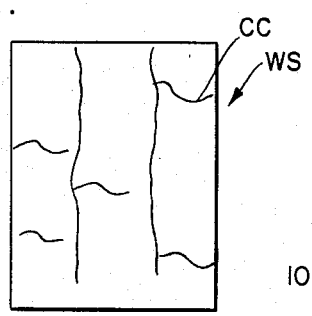
FIGS. 2-4 are top plan views of plates illustrating an application of the method and apparatus of the present invention to producing wide wear plates.
Figure 3:
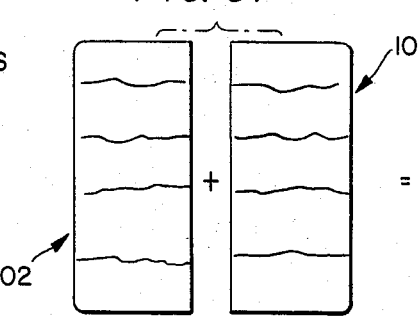
Figure 4:
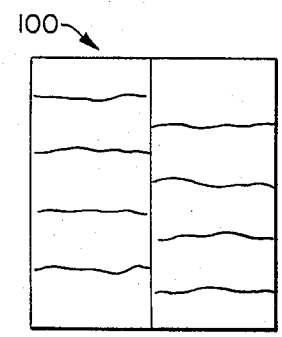

Thus, FIG. 2 shows a single hard faced wide sheet WS with crack checks CC defined therein. The sheet 100 shown in FIG. 4 can be formed by joining two narrow (relative to sheet 100) hard faced sheets 102 and 104 shown in FIG. 3, and the sheets 102 and 104 can be formed using the above-discussed process. Joining of the sheets 102 and 104 is illustrated in FIGS. 21-23 where bevelled plates 106 and 108 are hard faced using the above-described process to form hard faced plates 106' and 108' with surfacing S deposited thereon. The plates 106' and 108' are then joined by weld 110, or the like, to form the plate 100 shown in FIG. 4.

Figure 5:
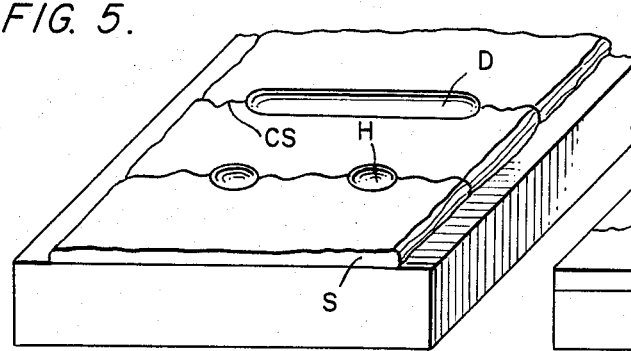
FIGS. 5 and 6 are perspective views illustrating an application of the method and apparatus embodying the teaching of the present invention in the production of plates having predetermined stress relief cracks in the surface material.
Figure 6:
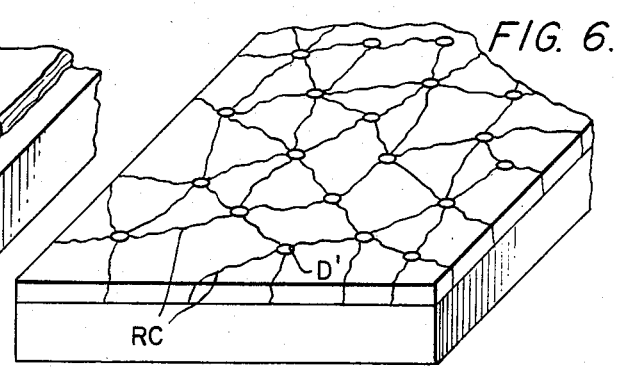
Figure 7:
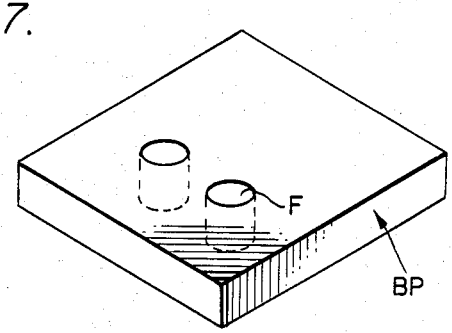
FIGS. 7-10 illustrate an application of the method and apparatus of the present invention to the production of holes in a wear plate for plug welding and bolting.
Figure 8:
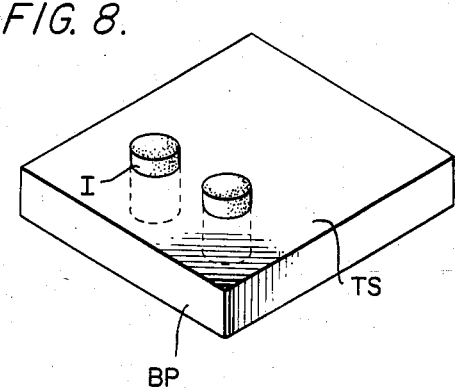
Figure 9:
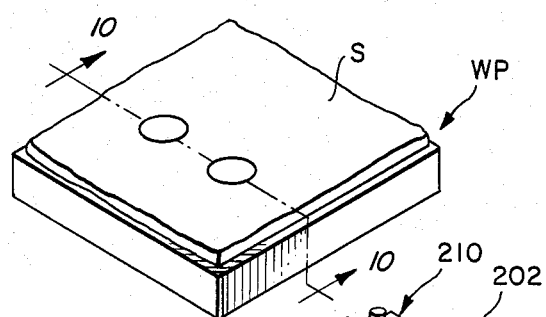
Figure 10:
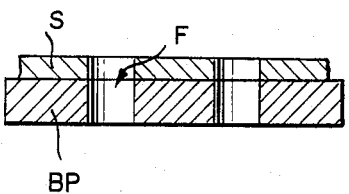

FIGS. 5 and 6 show how the above-discussed process is applied to fabricate wear plates by hard facing on mild or low alloy plates. Stress relief cracks CS are defined to reduce residual stresses and to prevent spalling during post weld forming or in service. While plates formed using the above-discussed process are relatively free of stress cracks, some such cracks may be required so such plates can perform bending or forming operations.

The present method is modified to initiate these stress relief cracks at will during the surfacing process. Cracks will form at sites of high stress concentration such as areas H and D shown in FIG. 5 and such sites may be holes, notches, or any other discontinuity in surface deposit S. These discontinuities can be generated by creating a dimple in the solidifying surface deposit. The dimples can be created with a suitable means, such as a graphite rod or a graphite plate of suitable shape. The dimple creating means is inserted to a predetermined depth during the cooling cycle before solidification. Upon cooling, excessive stresses are generated around the dimple and a stress crack results. The cracks can be connected in a predetermined path and frequency by suitably timing the insertion and placement of the dimple creating means into the molten puddle. Random cracks RC are shown in FIG. 6 and result from random placement of the dimples D'.

Because of a number of factors, such as inaccessibility, ease of welding and structural strength considerations, attachment by welding or bolting of wear plates into place is necessary. This often requires a hole or holes to be Electro Discharged Machined (EDM) through the hard facing at considerable cost. The above-disclosed method can be adapted for producing holes or slots in the hard facing during the surfacing process which eliminates the need for EDM. Such a method is illustrated in FIGS. 7-10.

Holes F can be produced in hard faced wear plates WP by first drilling a hole in the base plate BP, inserting an appropriate size insert I which is preferably a carbon or graphite rod. This insert extends above the base plate top surface TS, and preferably is only slightly higher than the predetermined deposit thickness. During surfacing, depending on the size and shape of the hole, the arc and deposited metal are allowed to fill in around the insert, thus creating the hole of the desired dimensions. After surfacing, the insert is removed, leaving a hole in both the base plate BP and the deposit S.

If the holes are small, the arc may not have to be interrupted; however, with large holes the arc may have to be interrupted to pass over the insert.

FIGS. 11-14 illustrate methods of wear plate production using the above-described process.

Figure 11:
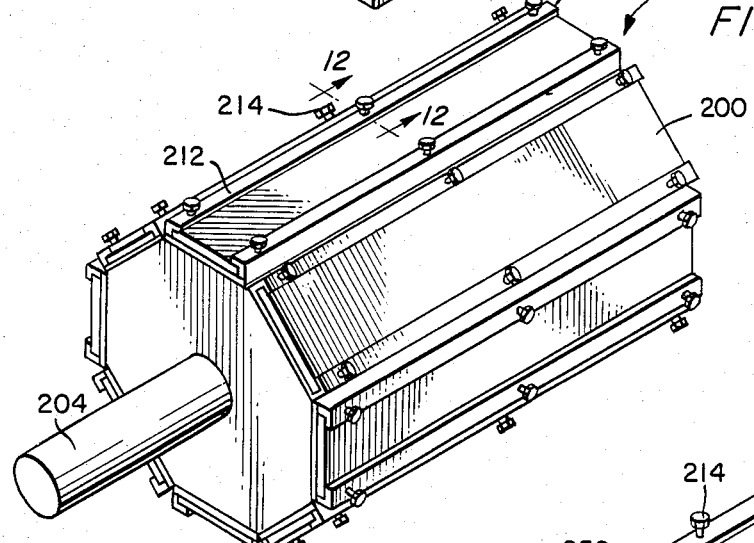

In FIG. 11, plates 200 are mounted on a multi-faced rack 202 that revolves on an axle 204 about the longitudinal centerline of that rack. As each plate is surfaced, the rack rotates to the next position and plate. Upon completing all plates, the entire assembly, including the rack and the axle, is removed, and another rack is moved into position. This method allows the first assembly to cool, while permitting work to continue on other assemblies. Racks are preferably four, six or eight sided, but can have any number of sides without departing from the scope of the present disclosure. Each rack can be equipped with clamping devices 210. The clamps 210 include a clamping bar 212 fastened to the rack by a bolt, such as bolt 214, so that plate 200 is securely mounted on surface 216 of the rack. Pre-loading of racks can minimize interruptions. Typically, wear plates sizes 12"×48"×½" can be fabricated, and large sheets can be fabricated from these plates.

Figure 13:
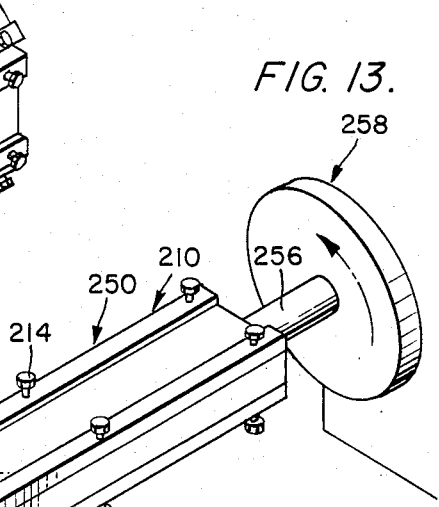
Figure 12:
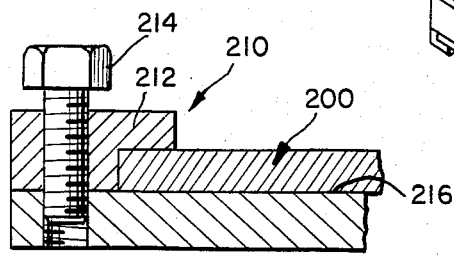

FIG. 13 shows a rack 250 for supporting two plates 252 and 254 during a surfacing process. The rack 250 includes an axle 256 which is removably mounted on rotating means 258. The plates are clamped to the rack by clamping devices 210 as discussed above, and the rack is rotated in the direction of the arrow shown in FIG. 13 by the rotating means 258. After surfacing plate 252, the rack is rotated into a position so that plate 254 can be surfaced.

The rack 250 is removably mounted on the means 258 so that the rack can be removed after both plates have been surfaced. These rack-mounted plates are then set aside for cooling, and another rack containing plates is mounted on means 258 for surfacing.

A continuous surfacing process is shown in FIG. 14. In this method, lengthy plates 260 are fed on a work table T into a surfacing station 262 which surfaces the plate according to the abovedescribed techniques as indicated with surfacing S in FIG. 14. The plate is fed by rolling means 264 having rolls 266 and 268 which are driven at desired rates by suitable means (not shown) and then to a suitable collecting and storing means (not shown). Great quantities of heat are generated during the surfacing process, which can be advantageously used during any post weld forming operations. In such a process, shrinkage cracks will be reduced. Any shrinkage that does take place can be accommodated on a pre-bent plate. The FIG. 14 method permits curved plates to be fabricated directly after surfacing allowing greater curvatures. A bending break means can be added to the FIG. 14 equipment to achieve smaller radius bends and other more severe hot forming procedures than obtainable in cold forming operations. Factors such as roll design and travel speeds can be adjusted to produce desired results. The FIG. 14 welding method provides opportunities for economic advantages: (1) elimination of clamping devices, (2) elimination of weld head travel mechanism (stepover) and (3) elimination of specially designed welding tables that accommodate clamps to handle various plate sizes.

Dredge pumps are often taken out of service for rebuilding (hard facing), and this causes a great deal of downtime. The method and apparatus of the present invention can be used to hard face such pumps, and is illustrated in FIGS. 15–20. In this method, worn pump parts are replaced with pre-fabricated wear plates.

FIG. 15 shows a conventional pump 300 and its major worn surface 302. FIG. 16 shows a specially fabricated pump 306 whereby the wearing surface 302 is replaced by a wear plate 310. The wear plate 310 can be mounted in place via nuts 312, or the like, without removing the pump from a dredge.

The plates 310 are fabricated using a hard facing wire and the above-discussed process. A completed plate 310 is shown in FIG. 17. Preferably, surfacing is done on a copper plate 320 as shown in FIG. 18. The plate 320 has countersunk holes 324 drilled in it to allow the insertion of bolts 330 as shown in FIG. 19, with heads 334 sticking above the plate surface 336. The surface S as shown in FIG. 20 is then deposited on a copper plate, and as the substrate arc comes into contact with a bolt, the bolt is surfaced or welded into the hard surfacing metal. The result is a plate comprising 100% hard surfacing metal with appropriate studs 350 to provide fastening to a backing. The plate can be properly curved to fit a pump shell. The studs and plate provide a much longer wearing surface than plates conventionally bolted from both sides. Otherwise, plate service life is limited by the bolt depth. When a worn surface reaches the safe limit of the bolt head, the wear plate should be replaced. The above described process can also be used to fabricate a composite plate comprised of hardfacing on top of a weldable substrate.

Using the method and device disclosed hereinabove, typical welding conditions for composite plate fabrication are as follows:

| | |
|---|---|
| Substrate Size | ¼" × 42-¾" × 24" |
| Material | 1020 Steel |
| Electrodes | High Chromium Iron (4.5 C, 25 Cr) |
| Electrode Size | 7/64" |
| Head Height | ⅞" |
| Positive Electrode Feed Rate | 517 inches/min |
| Negative Electrode Feed Rate | 300 inches/min |
| Machine Amps ($A_1$) | 800 |
| Ground Amps ($A_2$) | 200 |
| Machine Voltage | 65 |
| Oscillation Speed | 120"/min |
| Travel Speed | 30"/min |
| Travel Stepover Distance | ½" |

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A method of surfacing materials comprising the steps of: providing a workpiece to be surfaced, providing a power supply, providing first and second electrode wires formed of material to be deposited on the workpiece, connecting the first electrode wire to a positive circuit of the power supply, connecting the second electrode wire to a negative circuit of the power supply, establishing a wire arc between the first and second electrode wires, the wire arc melting the electrode wires to form surfacing material, establishing a substrate arc between the positive electrode wire and the workpiece, depositing the surfacing material onto the workpiece, and initiating stress relief cracks during the surfacing process.

2. The method defined in claim 1 wherein the step of initiating stress relief cracks includes defining sites of high stress concentration in the surface deposit.

3. The method defined in claim 1 further including steps of drilling a plurality of holes in the workpiece prior to surfacing said workpiece, positioning an insert in each of said holes to extend above the surface of the workpiece, and removing the insert from each hole after surfacing is completed.

4. The method defined in claim 1 and further including the step of joining workpieces after the surfacing process, and defining stress relief cracks in the workpieces prior to joining them.

5. Apparatus for surfacing a workpiece comprising: a power supply, first and second electrode wires formed of material to be deposited on the workpiece, said first electrode wire being connected to a positive circuit in said power supply and said second electrode wire being connected to a negative circuit in said power supply, a ground wire connecting the workpiece to the negative circuit in said power supply, a wire arc established between said electrode wires, a substrate arc established between said first electrode wire and the workpiece, and means for initiating stress relief cracks in the surfacing material deposited on the workpiece.

6. The method defined in claim 1, and the further step of moving the electrode wires in a path parallel to the surface of the workpiece in spaced relationship to such surface while depositing the surfacing material onto the workpiece.

7. The method defined in claim 1, and the further step of feeding the electrode wires toward said wire arc at predetermined rates while positioning the electrode wires at an angle to the workpiece surface.

8. The method defined in claim 7, and feeding the first and second electrode wires at different rates.

9. The apparatus defined in claim 5, and a plurality of inserts mounted in and extending through and projecting above one surface of the workpiece, whereby removal of said inserts after surfacing will provide through openings in the workpiece and surfacing material.

10. A method of surfacing materials comprising the steps of: providing a workpiece to be surfaced, providing a DC power supply of constant potential, providing first and second electrode wires formed of material to be deposited on the workpiece, connecting the first electrode wire to a positive terminal of the DC power supply, connecting the second electrode wire to a negative terminal of the DC power supply, connecting the workpieces to the negative terminal of the DC power supply, establishing a wire arc between the first and second electrode wires having a relatively greater proportion of the total ouput current from the DC power supply within the wire arc, establishing a substrate arc between the positive electrode wire and the workpiece having a relatively smaller proportion of the total output current from the DC power supply within the substrate arc, the current value ratio of the wire arc to the substrate arc being approximately 3:1, and depositing the surfacing material onto a face of the workpiece while maintaining said wire and substrate arcs.

11. The method of claim 1, wherein the workpiece being surfaced is unrestrained.

12. The method of claim 10, wherein the workpiece being surfaced is unrestrained.

13. The apparatus of claim 5, wherein the workpiece is unrestrained.

* * * * *